(12) United States Patent
Wu et al.

(10) Patent No.: US 7,881,598 B1
(45) Date of Patent: Feb. 1, 2011

(54) ANTI-SHAKE AUTO-FOCUS MODULAR STRUCTURE

(75) Inventors: Fu-Yuan Wu, Yangmei Taoyuan (TW); Chao-Chang Hu, Yangmei Taoyuan (TW)

(73) Assignee: TDK Taiwan Corporation, Taipei (TW)

( * ) Notice: Subject to any disclaimer, the term of this patent is extended or adjusted under 35 U.S.C. 154(b) by 0 days.

(21) Appl. No.: 12/630,688

(22) Filed: Dec. 3, 2009

(51) Int. Cl.
*G03B 17/00* (2006.01)
*G03B 3/10* (2006.01)

(52) U.S. Cl. .......................................... 396/55; 396/133
(58) Field of Classification Search .................... 396/55, 396/133; 348/208.99, 208.12
See application file for complete search history.

(56) References Cited

U.S. PATENT DOCUMENTS 7,161,621 B2  1/2007  Kai et al.

2009/0252488 A1 * 10/2009 Eromaki et al. ............. 396/529

FOREIGN PATENT DOCUMENTS

JP          2002-207148       7/2002

* cited by examiner

*Primary Examiner*—W. B. Perkey
*Assistant Examiner*—Minh Q Phan
(74) *Attorney, Agent, or Firm*—Muncy, Geissler, Olds & Lowe, PLLC

(57) ABSTRACT

An anti-shake auto-focus modular structure includes an image sensor, an auto-focus module for driving a lens to focus captured image on the image sensor; a plurality of suspension wires for suspending the auto-focus module at a position perpendicular to a light entering direction (z-axis), so that the auto-focus module is movable in an x-axis or a y-axis direction; a deviation compensation magnet assembly including at least one x-axis magnet and at least one y-axis magnet; a deviation compensation assembly including at least one x-axis driving winding and at least one y-axis driving winding corresponding to the x-axis magnet and the y-axis magnet, respectively, for producing an electromagnetic field each to drive the x-axis or the y-axis magnet and accordingly the auto-focus module to move in the x-axis or the y-axis direction for compensating a positional deviation of the auto-focus module in the x-axis or the y-axis direction.

21 Claims, 6 Drawing Sheets

ANTI-SHAKE AUTO-FOCUS MODULAR STRUCTURE

FIELD OF THE INVENTION

The present invention relates to an anti-shake auto-focus modular structure, and more particularly to a modularized structure that integrates the auto-focus and the anti-shake function of an advanced camera device into the camera lens.

BACKGROUND OF THE INVENTION

With the advancement in scientific technologies and the modularization and miniaturization of camera lens, it is now possible to produce digital cameras having a very small volume, and most of currently available mobile phones are provided with the function of a digital camera. On the other hand, to highlight the differences between the advanced camera devices and the low-level camera devices, higher image quality and more functions, such as highly increased pixels, multipoint auto-focus (AF) function, anti-shake (AS) function, etc., have been further added to the advanced camera devices.

However, every new function added to the image capturing module of a camera device would necessitate the increase of a corresponding modular mechanism to thereby increase the volume of the image capturing module. Therefore, it has become a target of all image capturing module manufacturers to further reduce the volume of the capturing module that has more functions.

There are various types of auto-focus driving structures for the conventional miniature lens. Among others, the voice coil motor (VCM) is the currently most widely employed auto-focus driving structure. The VCM includes an assembly of windings, magnets and plate springs to hold a lens thereto, so that the lens is able to move forward and rearward in an optical axis direction to thereby achieve the object of auto focusing or zooming. The VCM has the advantages of small volume, low power consumption, accurately actuated displacement, and cost-effective, and is therefore very suitable for short-distance driving in miniature lens auto-focusing.

With respect to the anti-shake function, it is achieved mainly through several ways. For example, the imaging element can utilize a compensation movement of a mechanism supporting frame to offset the influence of shake during shooting picture on the forming of a blurred image. Or, the lens can be provided with a mechanical structure to eliminate the shake. Or, two gyro sensors can be used to detect any vibration of the imaging element in horizontal and vertical directions, and use push by magnetic force to compensate such vibration.

Japanese Patent Laid Open No. 2002-207148 discloses a camera device as shown in FIG. 1, in which flexible sections 400-403 made of metal wires are used to hold a circuit board 301 of an image sensor 300, allowing the circuit board 301 to move in directions perpendicular to the optical axis 201. Further, two relative displacement sensors 500, 501 and a positional movement detector 503 are used to send the displacement of a lens assembly 203 consisting of a lens 200 and a lens holder 202 relative to the circuit board 301 in x-axis and y-axis directions to an anti-shake controller 504, so that the circuit board 301 is driven by a movement driving unit 502 based on the displacement to move correspondingly in directions perpendicular to the optical axis 201 to thereby avoid the image sensor 300 from producing blurred image due to shake while shooting a picture.

Japanese Patent Laid Open No. 2002-207148 teaches a concept of avoiding blurred image caused by shaking while shooting a picture. The inventor of the present invention combines the same concept with a modularized auto-focus mechanism to devise an anti-shake auto-focus modular structure to integrate the auto-focus function and the anti-shake function into one lens module to satisfy the demands for an advanced camera lens module.

SUMMARY OF THE INVENTION

A primary object of the present invention is to provide an anti-shake auto-focus modular structure that integrates the auto-focus and the anti-shake function of an advanced camera device into one camera lens.

To achieve the above and other objects, the anti-shake auto-focus modular structure according to the present invention can be installed on a hand-held device provided with a shake sensor capable of generating a movement signal in response to movement of the hand-held device, and includes an image circuit board having an image sensor provided thereon; an auto-focus module holding a lens thereto for capturing light and image, and driving the lens to move forward and rearward in a light entering direction (z-axis direction), so that the lens focuses the captured image on the image sensor; a plurality of suspension wires being connected to the auto-focus module, so that the auto-focus module is correspondingly suspended in the light entering direction relative to the image circuit board and allowed to move in an x-axis direction and a y-axis direction perpendicular to the light entering direction; a deviation compensation winding assembly including at least one x-axis driving winding and at least one y-axis driving winding, which each being capable of producing an electromagnetic field according to the movement signal generated by the shake sensor; a deviation compensation magnet assembly including at least one x-axis magnet and at least one y-axis magnet, which are suspended at positions corresponding to the x-axis driving winding and the y-axis driving winding, respectively, such that the deviation compensation magnet assembly is able to move in the x-axis direction or in the y-axis direction in response to the electromagnetic field produced by the deviation compensation winding assembly to thereby bring the auto-focus module to move in the x-axis direction or the y-axis direction; and an x-axis displacement sensor and a y-axis displacement sensor being arranged to one side of the x-axis driving winding and the y-axis driving winding, respectively, to thereby correspond to the x-axis magnet and the y-axis magnet, respectively, for detecting whether an x-axis deviation volume or a y-axis deviation volume produced by the x-axis magnet or the y-axis magnet during movement thereof has reached a deviation compensation position; and the x-axis displacement sensor or the y-axis displacement sensor causing the x-axis driving winding or the y-axis driving winding to stop producing the electromagnetic field when the x-axis magnet or the y-axis magnet has reached the deviation compensation position, so as to precisely compensate a positional deviation.

The anti-shake auto-focus modular structure of the present invention further includes a fixing member, via which the deviation compensation magnet assembly is fixedly connected to a bottom of the auto-focus module for bringing the auto-focus module to move along with the deviation compensation magnet assembly. Alternatively, the deviation compensation winding assembly is fixedly connected via the fixing member to the bottom of the auto-focus module for the auto-focus module to move along with the deviation compensation magnet assembly.

The anti-shake auto-focus modular structure of the present invention can further include an anti-shake driving circuit board, to which the x-axis displacement sensor, the y-axis displacement sensor, the x-axis driving winding, and the y-axis driving winding are electrically connected; and a supporting frame being arranged on the image circuit board for fixedly connecting the anti-shake driving circuit board to the image circuit board.

In the anti-shake auto-focus modular structure of the present invention, the image circuit board further has a sensor holder provided thereon to cover onto a top of the image sensor, and the sensor holder has a filter set at a center thereof.

BRIEF DESCRIPTION OF THE DRAWINGS

The structure and the technical means adopted by the present invention to achieve the above and other objects can be best understood by referring to the following detailed description of the preferred embodiment and the accompanying drawings, wherein.

DETAILED DESCRIPTION OF THE PREFERRED EMBODIMENTS

The present invention will now be described with a preferred embodiment thereof. However, it is understood the preferred embodiment and the accompanied drawings are illustrated only as an example of the present invention and the present invention is not limited to the illustrated preferred embodiment.

Figure 1:
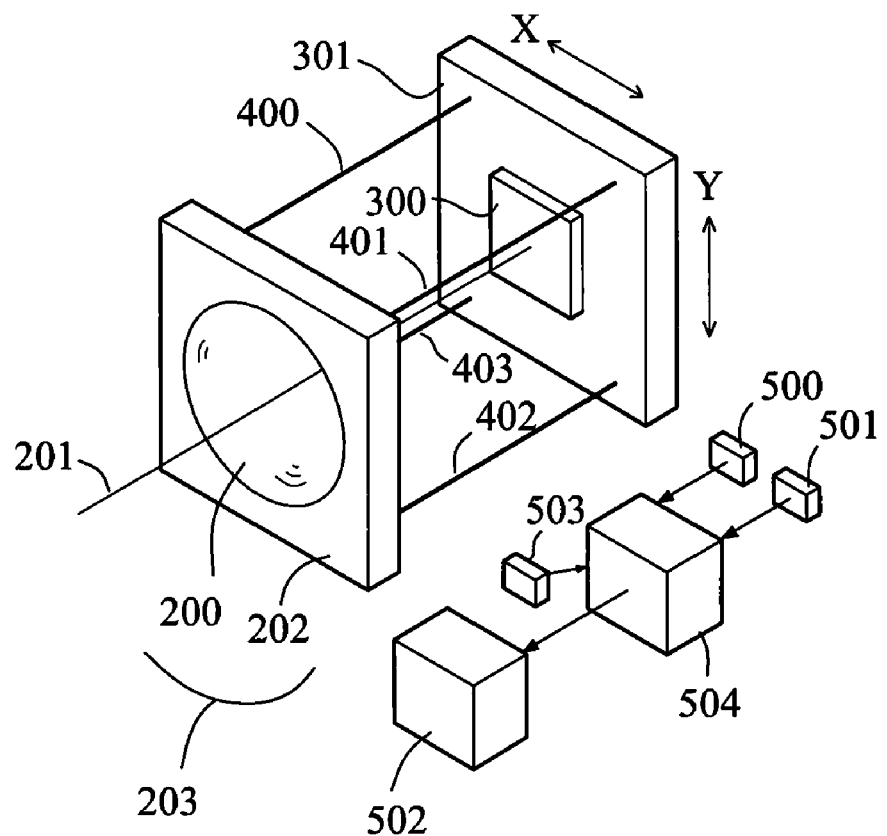
FIG. 1 is a conceptual view of a prior art anti-shake camera device according to Japanese Patent Laid Open No. 2002-207148.
Figure 2:
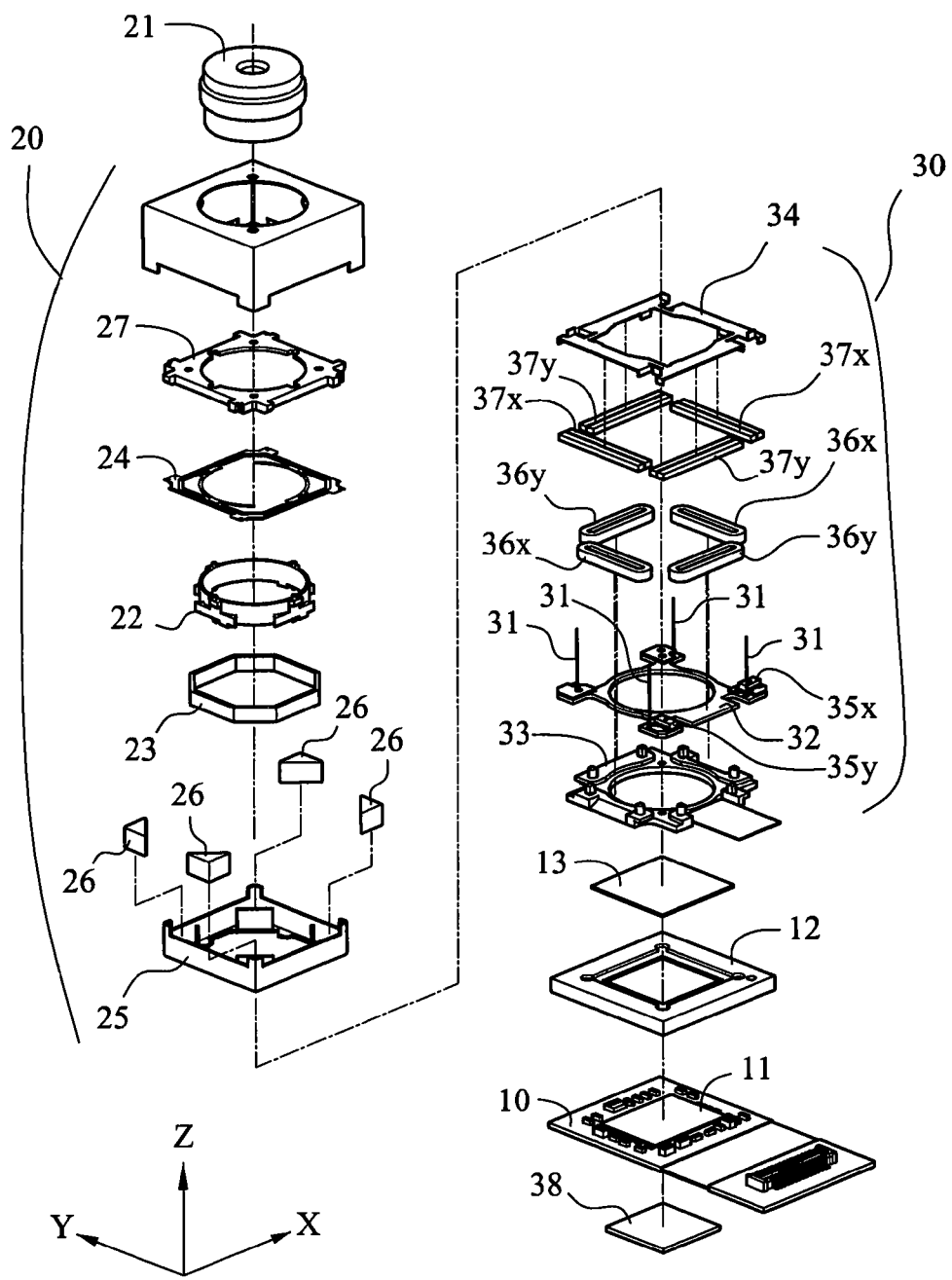
FIG. 2 is an exploded perspective view of an anti-shake auto-focus modular structure according to a preferred embodiment of the present invention.
Figure 3:
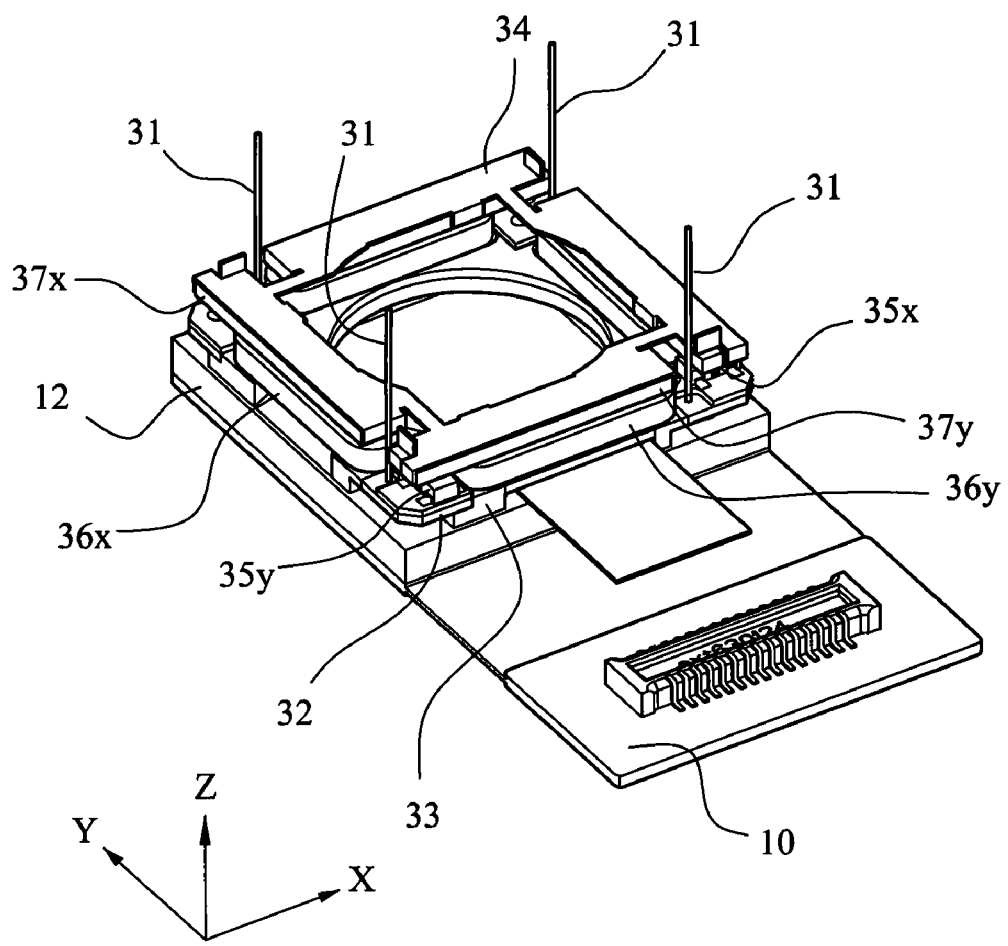
FIG. 3 is a perspective view showing an assembly of an anti-shake mechanism and an image circuit board included in the present invention.
Figure 4:
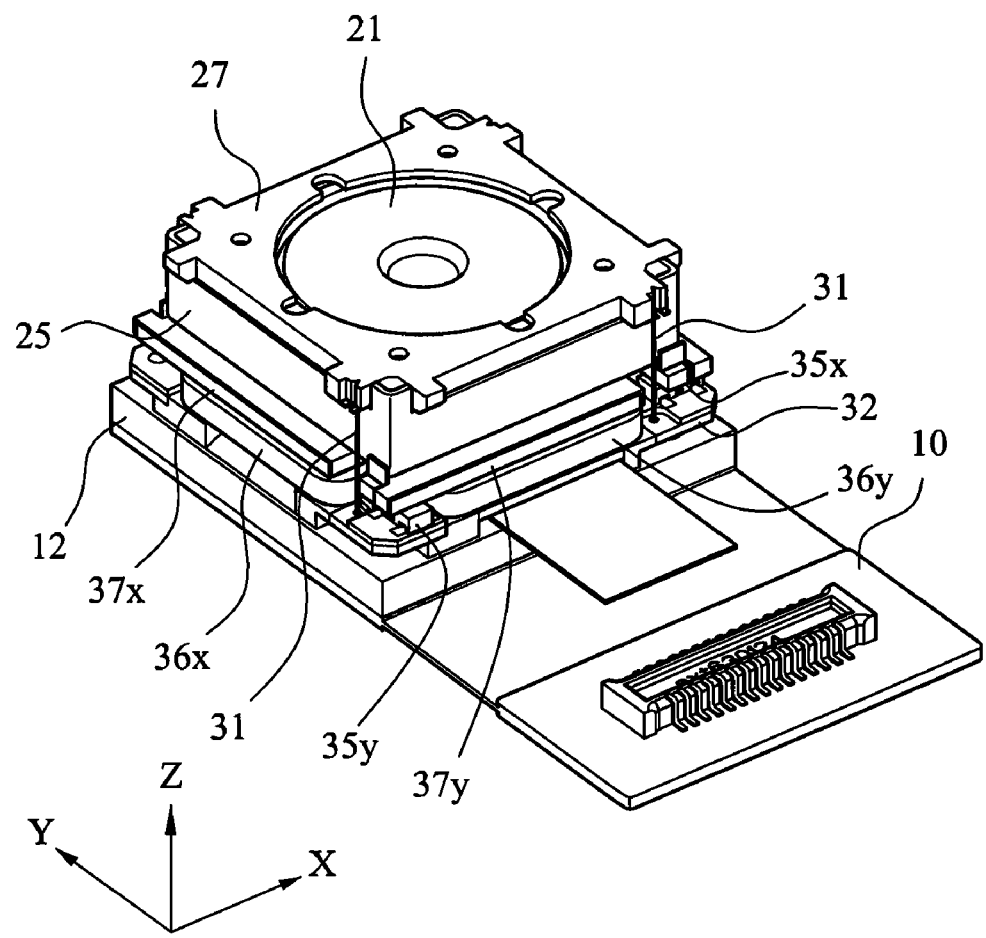
FIG. 4 is assembled view of FIG. 2.

Please refer to FIGS. 2 and 4 that are exploded and assembled perspective views, respectively, of an anti-shake auto-focus modular structure according to a preferred embodiment of the present invention, and to FIG. 3 that is a perspective view showing an assembly of an anti-shake mechanism and an image circuit board included in the present invention.

The anti-shake auto-focus modular structure of the present invention is mainly for installing on a hand-held device (not shown) to serve as an advanced image pickup module. The hand-held device is provided with a shake sensor such as a Gyro sensor, an accelerometer, etc., for generating a movement signal in response to movement of the hand-held device, such as a movement signal in response to shake of the hand-held device when the device is used to shoot a picture.

The anti-shake auto-focus modular structure according to the preferred embodiment of the present invention includes an image circuit board 10, an auto-focus module 20, and an anti-shake mechanism 30. On the image circuit board 10, there is provided an image sensor 11 being covered by a sensor holder 12. A filter 13 is set at a center of the sensor holder 12.

The auto-focus module 20 holds a lens 21 thereto for capturing light and image. The lens 21 and the image sensor 11 are aligned with each other on z-axis, that is, a line along which light enters into the lens 21. The auto-focus module 20 drives the lens 21 to move forward and rearward in the light entering direction (z-axis), so that the lens 21 can focus the captured image on the image sensor 11.

The auto-focus module 20 is preferably a voice coil motor (VCM) driving structure and includes a lens holder 22 for holding and locking the lens 21 thereto, a winding 23 arranged around the lens holder 22, an upper plate spring 24 connected at an inner movable portion to the lens holder 22 and at an outer fixed portion to a base 25, four magnets 26 arranged within the base 25 corresponding to the winding 23, and an upper cover 27 closed onto a top of the base 25.

The anti-shake mechanism 30 is arranged between the image circuit board 10 and the auto-focus module 20 mainly for driving the auto-focus module 20 to move in x-axis or y-axis direction (vertical to z-axis, i.e., the light entering direction) according to a movement signal generated by the shake sensor, so as to compensate an instantaneous shake-caused positional deviation.

To this end, the anti-shake mechanism 30 includes a plurality of suspension wires 31, an anti-shake driving circuit board 32, a supporting frame 33, a fixing member 34, an x-axis displacement sensor 35$x$, a y-axis displacement sensor 35$y$, a deviation compensation winding assembly and a deviation compensation magnet assembly.

The suspension wires 31 are made of a flexible wire material and are electrically conductive. Preferably, four suspension wires 31 are provided. The suspension wires 31 are connected at respective one end to near four corners of the upper cover 27 of the auto-focus module 20, and at the other end to the anti-shake driving circuit board 32, such that the auto-focus module 20 is correspondingly suspended on the z-axis or in the light entering direction relative to the image circuit board 10 and is allowed to move in the x-axis and the y-axis direction perpendicular to the light entering direction. The suspension wires 31 also serve as conducting wires to transfer current for driving the auto-focus module 20 to move.

The supporting frame 33 is arranged in front of the image circuit board 10 for fixedly connecting the anti-shake driving circuit 32 to the sensor holder 12 on the image circuit board 10.

Figure 5:
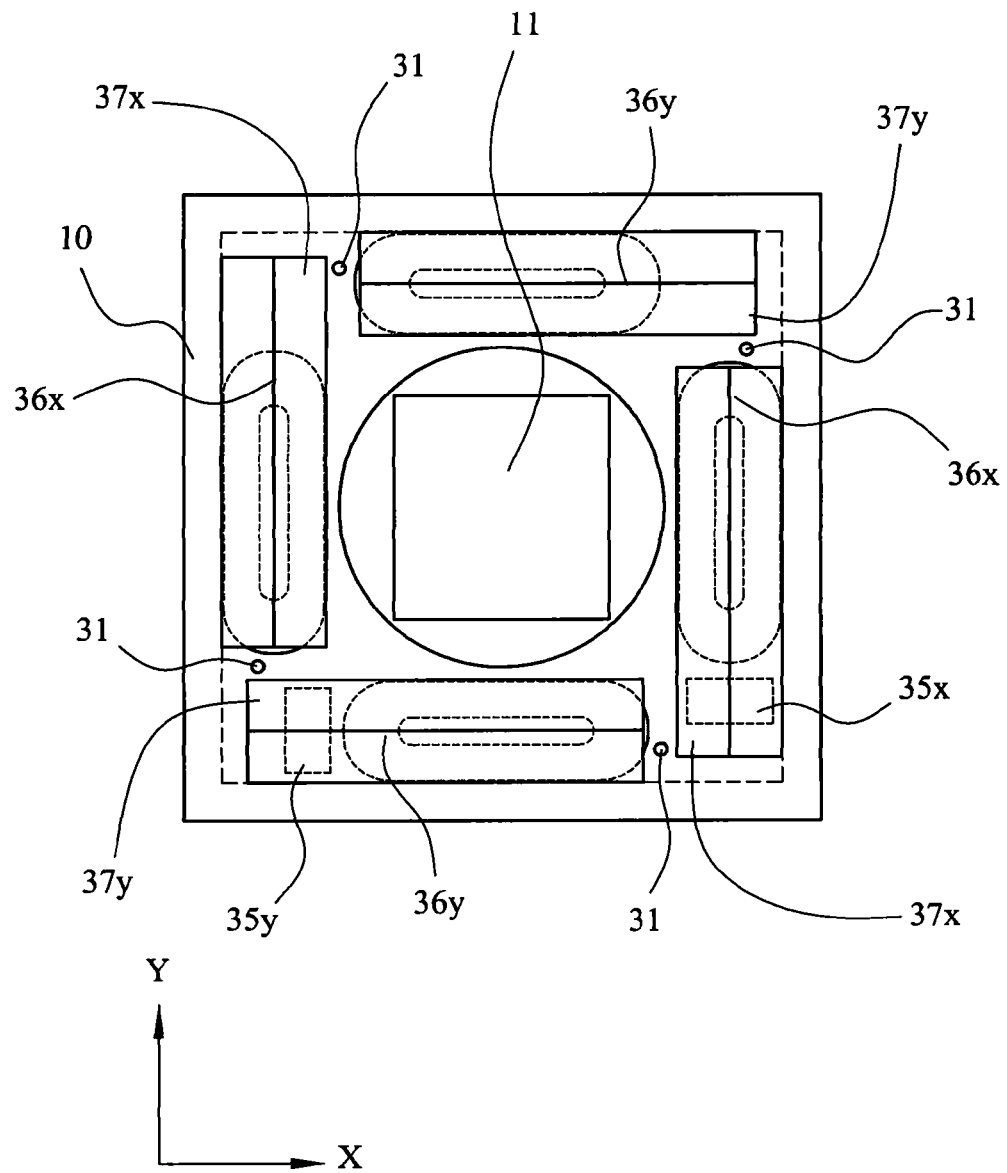
FIG. 5 is a plan view showing the operation of the present invention.

The deviation compensation winding assembly includes at least one x-axis driving winding 36$x$ and at least one y-axis driving winding 36$y$; and the deviation compensation magnet assembly includes at least one x-axis magnet 37$x$ and at least one y-axis magnet 37$y$. The x-axis driving winding 36$x$ is suspended at a position corresponding to the x-axis magnet 37$x$, and the y-axis driving winding 36$y$ is suspended at a position corresponding to the y-axis magnet 37$y$. FIG. 5 is a plan view showing the operation of two sets of compensation winding assemblies corresponding to two sets of compensation magnet assemblies in the present invention, and FIG. 6 is a side view showing the operation of one set of compensation winding assembly corresponding to one set of compensation magnet assembly in the present invention.

Preferably, the deviation compensation winding assembly is fixedly connected to the anti-shake driving circuit board 32, and the deviation compensation magnet assembly is fixedly connected via the fixing member 34 to a bottom of the auto-focus module 20. Alternatively, the deviation compensation winding assembly is fixedly connected via the fixing member 34 to a bottom of the auto-focus module 20 while the deviation compensation magnet assembly is fixedly connected to the anti-shake driving circuit board 32.

Figure 6:
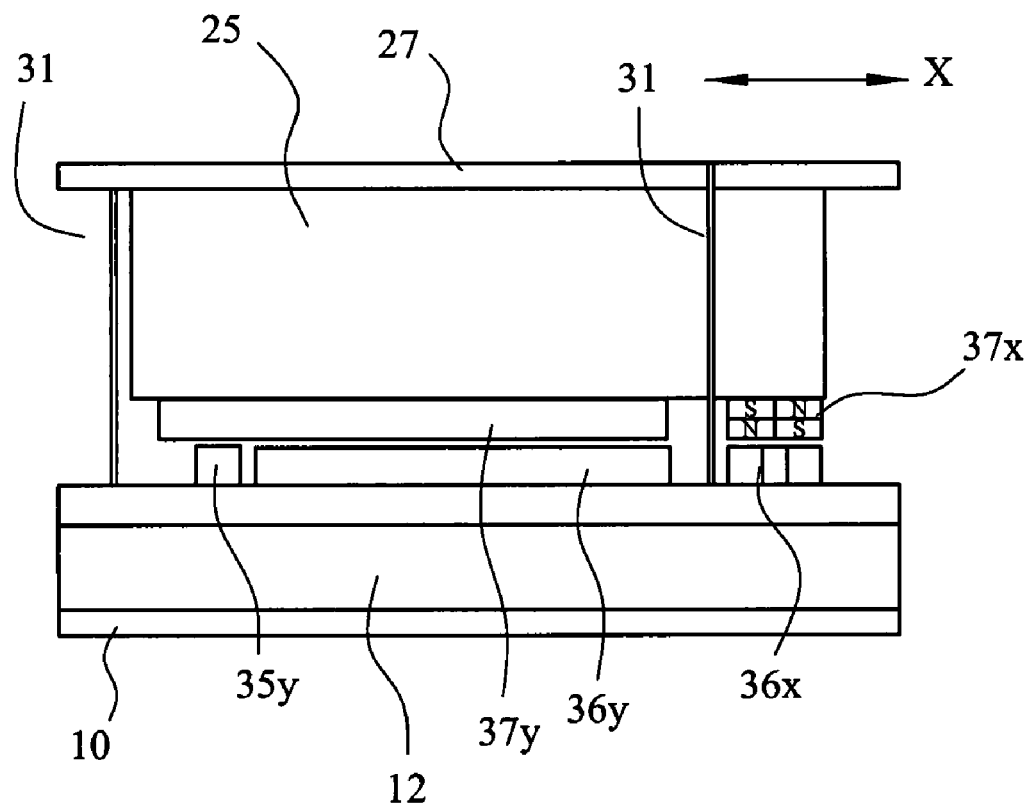
FIG. 6 is a side view showing the operation of the present invention.

The x-axis displacement sensor 35$x$ and the y-axis displacement sensor 35$y$ are arranged to one side of the x-axis driving winding 36$x$ and the y-axis driving winding 36$y$, respectively, to also suspend at positions corresponding to the x-axis magnet 37x and the y-axis magnet 37y, as shown in FIGS. 5 and 6.

The x-axis displacement sensor 35x, the y-axis displacement sensor 35y, the x-axis driving winding 36x, and the y-axis driving winding 36y are electrically connected to the anti-shake driving circuit 32, which is then further electrically connected to the image circuit board 10. The x-axis displacement sensor 35x and the y-axis displacement sensor 35y are provided with a driving circuit each adapted to receive a movement signal generated by the shake sensor on the hand-held device and convert the received movement signal into driving current, which is then output to the x-axis driving winding 36x and y-axis driving winding 36y for the same to produce an electromagnetic field and thereby drive the x-axis magnet 37x and the y-axis magnet 37y to move in the x-axis or the y-axis direction, so as to compensate the instantaneous positional deviation of the auto-focus module 20 in the x-axis or in the y-axis direction.

The x-axis displacement sensor 35x and the y-axis displacement sensor 35y are preferably displacement sensing devices selected from the group consisting of a Hall sensor, a magneto-resistive sensor, a fluxgate sensor, an optical position sensor, and an optical encoder for detecting the volume of movement of the x-axis magnet 37x and the y-axis magnet 37y during movement thereof. When the x-axis magnet 37x or the y-axis magnet 37y has moved to the position compensating the instantaneous deviation of the auto-focus module 20, the x-axis displacement sensor 35x or the y-axis displacement sensor 35y would send a signal to the driving circuit to stop the same from outputting the driving current to the x-axis driving winding 36x or the y-axis driving winding 36y, so as to achieve the precise instantaneous deviation compensation effect.

As can be seen from FIG. 2, the present invention can further includes a shake sensor 38 electrically connected to the image circuit board 10 for sensing any shake and generating a movement signal accordingly, and the movement signal is directly output to the driving circuits, so that the present invention can be used with a hand-held device that is not provided with a shake sensor.

Please refer to FIGS. 5 and 6 at the same time, which are plan and side views, respectively, showing the operation of the present invention. As shown, the image circuit board 10 is fixed in position; the auto-focus module 20 holds the lens 21 for the same to not only move forward and rearward in the z-axis direction or the light entering direction to focus, but also move in the x-axis direction or the y-axis direction perpendicular to the light entering direction to avoid a blurred image.

When a shake causes the shake sensor 38 to generate a movement signal, the movement signal is computed by the driving circuits to generate corresponding x-axis or y-axis driving current, which is output to the x-axis driving winding 36x or the y-axis driving winding 36y for the same to generate an electromagnetic field, so as to drive the x-axis magnet 37x or the y-axis magnet 37y to move in the x-axis direction or the y-axis direction.

The x-axis displacement sensor 35x and the y-axis displacement sensor 35y respectively detect whether the x-axis magnet 37x and the y-axis magnet 37y have reached a corresponding x-axis deviation and a predetermined y-axis deviation. When the x-axis or the y-axis instantaneous deviation compensation position is reached, a signal is generated by the x-axis displacement sensor 35x or the y-axis displacement sensor 35y to the driving circuit thereof for the same to stop outputting the driving current to the x-axis driving winding 36x or the y-axis driving winding 36y, so as to achieve the purpose of avoiding a blurred image caused by shake while shooting a picture.

In brief, the anti-shake auto-focus modular structure of the present invention integrates the auto-focus function and the anti-shake function possessed by an advanced camera device into a camera lens module to thereby reduce the volume of the camera lens module and allow the same to be built in a small-size portable device, such as a mobile phone.

The present invention has been described with a preferred embodiment thereof and it is understood that many changes and modifications in the described embodiment can be carried out without departing from the scope and the spirit of the invention that is intended to be limited only by the appended claims.

What is claimed is:

1. An anti-shake auto-focus modular structure for installing on a hand-held device provided with a shake sensor capable of generating a movement signal in response to movement of the hand-held device, comprising:

an image circuit board having an image sensor provided thereon;

an auto-focus module holding a lens thereto for capturing light and image, and driving the lens to move forward and rearward in a light entering direction, so that the lens focuses the captured image on the image sensor;

a plurality of suspension wires being connected to the auto-focus module, so that the auto-focus module is correspondingly suspended in the light entering direction relative to the image circuit board and is allowed to move in an x-axis and a y-axis direction perpendicular to the light entering direction;

a deviation compensation winding assembly including at least one x-axis driving winding and at least one y-axis driving winding, which are capable of producing an electromagnetic field each according to the movement signal generated by the shake sensor;

a deviation compensation magnet assembly including at least one x-axis magnet and at least one y-axis magnet, which are suspended at positions corresponding to the x-axis driving winding and the y-axis driving winding, respectively, such that the deviation compensation magnet assembly is able to move in the x-axis direction or in the y-axis direction in response to the electromagnetic field produced by the deviation compensation winding assembly to thereby bring the auto-focus module to move in the x-axis direction or the y-axis direction; and an x-axis displacement sensor and a y-axis displacement sensor being arranged to one side of the x-axis driving winding and the y-axis driving winding, respectively, to thereby correspond to the x-axis magnet and the y-axis magnet, respectively, for detecting whether an x-axis deviation volume or a y-axis deviation volume produced by the x-axis magnet or the y-axis magnet during movement thereof has reached a deviation compensation position; and the x-axis displacement sensor or the y-axis displacement sensor causing the x-axis driving winding or the y-axis driving winding to stop producing the electromagnetic field when the x-axis magnet or the y-axis magnet has reached the deviation compensation position, so as to precisely compensate a positional deviation.

2. The anti-shake auto-focus modular structure as claimed in claim 1, wherein the auto-focus module is a voice coil motor (VCM) driving structure.

3. The anti-shake auto-focus modular structure as claimed in claim 1, wherein the suspension wires are made of a flexible wire material.

4. The anti-shake auto-focus modular structure as claimed in claim 1, wherein the suspension wires are electrically conductive to serve as conducting wires to transfer current for driving the auto-focus module to move.

5. The anti-shake auto-focus modular structure as claimed in claim 1, wherein the shake sensor of the hand-held device is selected from the group consisting of a gyro sensor and an accelerometer.

6. The anti-shake auto-focus modular structure as claimed in claim 1, wherein the x-axis displacement sensor and the y-axis displacement sensor are selected from the group consisting of a Hall sensor, a magneto-resistive sensor, a fluxgate sensor, an optical position sensor, and an optical encoder.

7. The anti-shake auto-focus modular structure as claimed in claim 1, wherein the shake sensor is electrically connected to the image circuit board for generating a movement signal when a shake is sensed.

8. The anti-shake auto-focus modular structure as claimed in claim 1, further comprising a fixing member, via which the deviation compensation magnet assembly is fixedly connected to a bottom of the auto-focus module for the auto-focus module to move along with the deviation compensation magnet assembly.

9. The anti-shake auto-focus modular structure as claimed in claim 1, further comprising a fixing member, via which the deviation compensation winding assembly is fixedly connected to a bottom of the auto-focus module for the auto-focus module to move along with the deviation compensation magnet assembly.

10. The anti-shake auto-focus modular structure as claimed in claim 1, further comprising:
    an anti-shake driving circuit board, to which the x-axis displacement sensor, the y-axis displacement sensor, the x-axis driving winding, and the y-axis driving winding are electrically connected; and
    a supporting frame being arranged in front of the image circuit board for fixedly connecting the anti-shake driving circuit board to the image circuit board.

11. The anti-shake auto-focus modular structure as claimed in claim 1, wherein the image circuit board further has a sensor holder provided thereon to cover onto the image sensor, and the sensor holder has a filter set at a center thereof.

12. An anti-shake auto-focus modular structure, comprising:
    an image sensor;
    an auto-focus module holding a lens thereto for capturing light and image, and driving the lens to move forward and rearward in a light entering direction, so that the lens focuses the captured image on the image sensor;
    a plurality of suspension wires for suspending the auto-focus module at a position perpendicularly to the light entering direction, so that the auto-focus module is able to move in an x-axis and a y-axis direction;
    a deviation compensation magnet assembly including at least one x-axis magnet and at least one y-axis magnet; and
    a deviation compensation winding assembly including at least one x-axis driving winding and at least one y-axis driving winding located corresponding to the x-axis driving winding and the y-axis driving winding, respectively, and each being capable of producing an electromagnetic field to drive the x-axis magnet to move in the x-axis direction or drive the y-axis magnet to move in the y-axis direction, and accordingly bring the auto-focus module to move in the x-axis direction or the y-axis direction at the same time.

13. The anti-shake auto-focus modular structure as claimed in claim 12, wherein the auto-focus module is a voice coil motor (VCM) driving structure.

14. The anti-shake auto-focus modular structure as claimed in claim 12, wherein the suspension wires are made of a flexible wire material.

15. The anti-shake auto-focus modular structure as claimed in claim 12, wherein the suspension wires are electrically conductive to serve as conducting wires to transfer current for driving the auto-focus module to move.

16. The anti-shake auto-focus modular structure as claimed in claim 12, wherein the deviation compensation winding assembly is able to receive a movement signal generated by a shake sensor to produce the electromagnetic field for driving the deviation compensation magnet assembly to move in the x-axis direction or the y-axis direction.

17. The anti-shake auto-focus modular structure as claimed in claim 16, wherein the shake sensor of the hand-held device is selected from the group consisting of a gyro sensor and an accelerometer.

18. The anti-shake auto-focus modular structure as claimed in claim 12, further comprising an x-axis displacement sensor and a y-axis displacement sensor being arranged to one side of the x-axis driving winding and the y-axis driving winding, respectively, to thereby correspond to the x-axis magnet and the y-axis magnet, respectively, for detecting whether an x-axis deviation volume or a y-axis deviation volume produced by the x-axis magnet or the y-axis magnet during movement thereof has reached a deviation compensation position; and the x-axis displacement sensor or the y-axis displacement sensor causing the x-axis driving winding or the y-axis driving winding to stop producing the electromagnetic field when the x-axis magnet or the y-axis magnet has reached the deviation compensation position, so as to precisely compensate a positional deviation.

19. The anti-shake auto-focus modular structure as claimed in claim 18, wherein the x-axis displacement sensor and the y-axis displacement sensor are selected from the group consisting of a Hall sensor, a magneto-resistive sensor, a fluxgate sensor, an optical position sensor, and an optical encoder.

20. The anti-shake auto-focus modular structure as claimed in claim 12, further comprising a fixing member, via which the deviation compensation magnet assembly is fixedly connected to a bottom of the auto-focus module for the auto-focus module to move along with the deviation compensation magnet assembly.

21. The anti-shake auto-focus modular structure as claimed in claim 12, further comprising a fixing member, via which the deviation compensation winding assembly is fixedly connected to a bottom of the auto-focus module for the auto-focus module to move along with the deviation compensation magnet assembly.

* * * * *